United States Patent
Lo et al.

(10) Patent No.: US 9,253,173 B2
(45) Date of Patent: Feb. 2, 2016

(54) SYSTEM AND METHOD FOR SUPPORTING SECURITY ADMINISTRATION

(75) Inventors: Hong-Hsi Lo, East Brunswick, NJ (US); Rich Lee, Morristown, NJ (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 21 days.

(21) Appl. No.: 12/900,268

(22) Filed: Oct. 7, 2010

(65) Prior Publication Data

US 2011/0023095 A1 Jan. 27, 2011

Related U.S. Application Data

(63) Continuation of application No. 10/731,371, filed on Dec. 9, 2003, now Pat. No. 7,831,999.

(60) Provisional application No. 60/432,125, filed on Dec. 9, 2002.

(51) Int. Cl.
H04L 29/06 (2006.01)

(52) U.S. Cl.
CPC ............ *H04L 63/08* (2013.01); *H04L 63/0815* (2013.01); *H04L 63/102* (2013.01); *H04L 63/101* (2013.01)

(58) Field of Classification Search
USPC .......................................................... 726/3
See application file for complete search history.

(56) References Cited

U.S. PATENT DOCUMENTS

| | | | |
|---|---|---|---|
| 6,141,686 A | 10/2000 | Jackowski | |
| 6,523,027 B1 * | 2/2003 | Underwood | ............ G06F 9/465 |
| 6,609,121 B1 * | 8/2003 | Ambrosini | ........ G06F 17/30589 |
| | | | 707/763 |
| 6,732,160 B2 * | 5/2004 | Ambrosini | ........ G06F 17/30589 |
| | | | 707/999.003 |
| 7,024,476 B1 * | 4/2006 | Page | ................... H04L 41/0809 |
| | | | 709/224 |
| 7,386,877 B2 * | 6/2008 | Winiger et al. | ................... 726/3 |
| 7,552,470 B2 * | 6/2009 | Dominic | ............... H04L 63/083 |
| | | | 726/8 |
| 2002/0029200 A1 | 3/2002 | Dulin et al. | |
| 2002/0095571 A1 * | 7/2002 | Bradee | ................. G06F 21/6218 |
| | | | 713/164 |
| 2002/0120697 A1 * | 8/2002 | Generous | ................ H04L 29/06 |
| | | | 709/206 |

(Continued)

OTHER PUBLICATIONS

Gutzmann, Kurt. "Access control and session management in the HTTP environment." Internet Computing, IEEE 5.1 (2001): 26-35.*

(Continued)

*Primary Examiner* — Harris C Wang
(74) *Attorney, Agent, or Firm* — Tucker Ellis LLP

(57) ABSTRACT

A transactional server is configured to receive a transactional procedure call from a client to initiate one or more transaction processes. Said transactional server includes a Lightweight Directory Access Protocol (LDAP) authentication server which is configured to forward the transactional procedure call from the transactional server to a distributed authentication server for authentication. When the transactional procedure call to initiate a transaction is received at the transactional server, the LDAP authentication server identifies a user associated with the transactional procedure call, determines that the distributed authentication server should authenticate the user, and initiates an LDAP session between the transactional server and the distributed authentication server. Then, after receiving from the distributed authentication server corresponding user information, the LDAP authentication server creates a token reflecting an authentication result based on the corresponding user security information, which is subsequently used to authenticate the client to participate in the transaction.

20 Claims, 2 Drawing Sheets

(56) References Cited

U.S. PATENT DOCUMENTS

| | | | |
|---|---|---|---|
| 2002/0138551 A1* | 9/2002 | Erickson | 709/203 |
| 2002/0194244 A1* | 12/2002 | Raventos | G06F 9/466 |
| | | | 718/101 |
| 2003/0005297 A1 | 1/2003 | Fichtner et al. | |
| 2003/0033535 A1* | 2/2003 | Fisher | G06F 9/468 |
| | | | 713/185 |
| 2004/0010715 A1* | 1/2004 | Winiger | G06F 21/31 |
| | | | 726/6 |
| 2004/0103323 A1* | 5/2004 | Dominic | H04L 63/083 |
| | | | 726/4 |
| 2011/0023095 A1* | 1/2011 | Lo | H04L 63/08 |
| | | | 726/4 |

OTHER PUBLICATIONS

BEA Systems, Inc., "Overview of the CORBA Security Features," 2001, e-docs.bea.com/tuxedo/tux80/security/overview.htm, pp. 2-7.

BEA Systems, Inc., "The WebLogic Enterprise Security Features," 2000, edocs.bea.com/wle/security/concepts.htm, pp. 2, 6, 8, 9, 21.

TheServerSide.com, "BEA Announces BEA Tuxedo 8.0 and BEA Weblogic 6.0," published on Jun. 12, 2001, 5 pages.

Zois.co.uk, "Using Tuxedo Asynchronously With Global Transactions," Technical Note Apr. 23, 2001, 4 pages.

* cited by examiner

SYSTEM AND METHOD FOR SUPPORTING SECURITY ADMINISTRATION

CLAIM OF PRIORITY

This application is a continuation of U.S. patent application Ser. No. 10/731,371, entitled "SYSTEM AND METHOD FOR SINGLE SECURITY ADMINISTRATION" filed Dec. 9, 2003, which is now U.S. Pat. No. 7,831,999, issued on Nov. 9, 2010, which claims the benefit of priority under 35 U.S.C. §119(e) to U.S. Provisional Patent Application entitled "SYSTEM AND METHOD FOR SINGLE SECURITY ADMINISTRATION", Ser. No. 60/432,125; filed Dec. 9, 2002, which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention is generally related to application servers and other enterprise servers, and particularly to a system and method for administering security in complex or distributed server environments.

BACKGROUND OF THE INVENTION

In the application server marketplace, an enterprise-level customer will often utilize two or more different types of server product, some of which may be a newer version of a particular application server product, while others may be older versions, or even legacy systems. Many of these customers need the ability to implement an enterprise security framework that encompasses all of the application servers. For example, a customer who uses both Tuxedo and WebLogic Server (WLS) might want to simplify their system administration work at the security level so that they can manage enterprise security from a central point. Today these customers will have two sets of security to manage—one set for their Tuxedo product, and the other set for their WLS product. If a particular user needs to access services in both the Tuxedo and the WLS environments then the system administrator will have to add or modify the same user information to both Tuxedo and WLS for that particular user. This repetition of administrative work is both cumbersome and error-prone. To date, there is no feature that provides the administrator with a centralized means for managing security that spans both (for example the Tuxedo and WebLogic) environments.

SUMMARY OF THE INVENTION

The present invention solves this problem by consolidating all user related information in WebLogic Server. In the past the system administrator would have to administer the user information in both Tuxedo and WLS. If an application server developer or customer had both an application server (for example WebLogic Server) and another enterprise system (for example Tuxedo) deployed within their environment, then they would usually have to manage two sets of security information, in this instance one for WebLogic Server and the other one for Tuxedo. The invention leverages the application server security to help the system administrator managing their security database by eliminating user and group information from the enterprise system. System-specific information, such as Access Control List information can still reside in the Tuxedo product.

In accordance with one embodiment, a method is provided for providing single security administration comprising the steps of: allowing a client (for example a Tuxedo client) to access a default security plugin; issuing a tpinit call to an LDAP authentication server at a first (Tuxedo) server; passing query user information from the LDAP authentication server to an embedded LDAP server at a second (WLS) server; returning corresponding user information to the LDAP authentication server; and, providing an authentication token for use by the client.

In accordance with one embodiment, a transactional server is configured to receive a transactional procedure call from a client to initiate one or more transaction processes. Said transactional server includes a Lightweight Directory Access Protocol (LDAP) authentication server which is configured to forward the transactional procedure call from the transactional server to a distributed authentication server for authentication. When the transactional procedure call to initiate a transaction is received at the transactional server, the LDAP authentication server identifies a user associated with the transactional procedure call, determines that the distributed authentication server should authenticate the user, and initiates an LDAP session between the transactional server and the distributed authentication server. Then, after receiving from the distributed authentication server corresponding user information, the LDAP authentication server creates a token reflecting an authentication result based on the corresponding user security information, which is subsequently used to authenticate the client to participate in the transaction.

DETAILED DESCRIPTION

Figure 1:
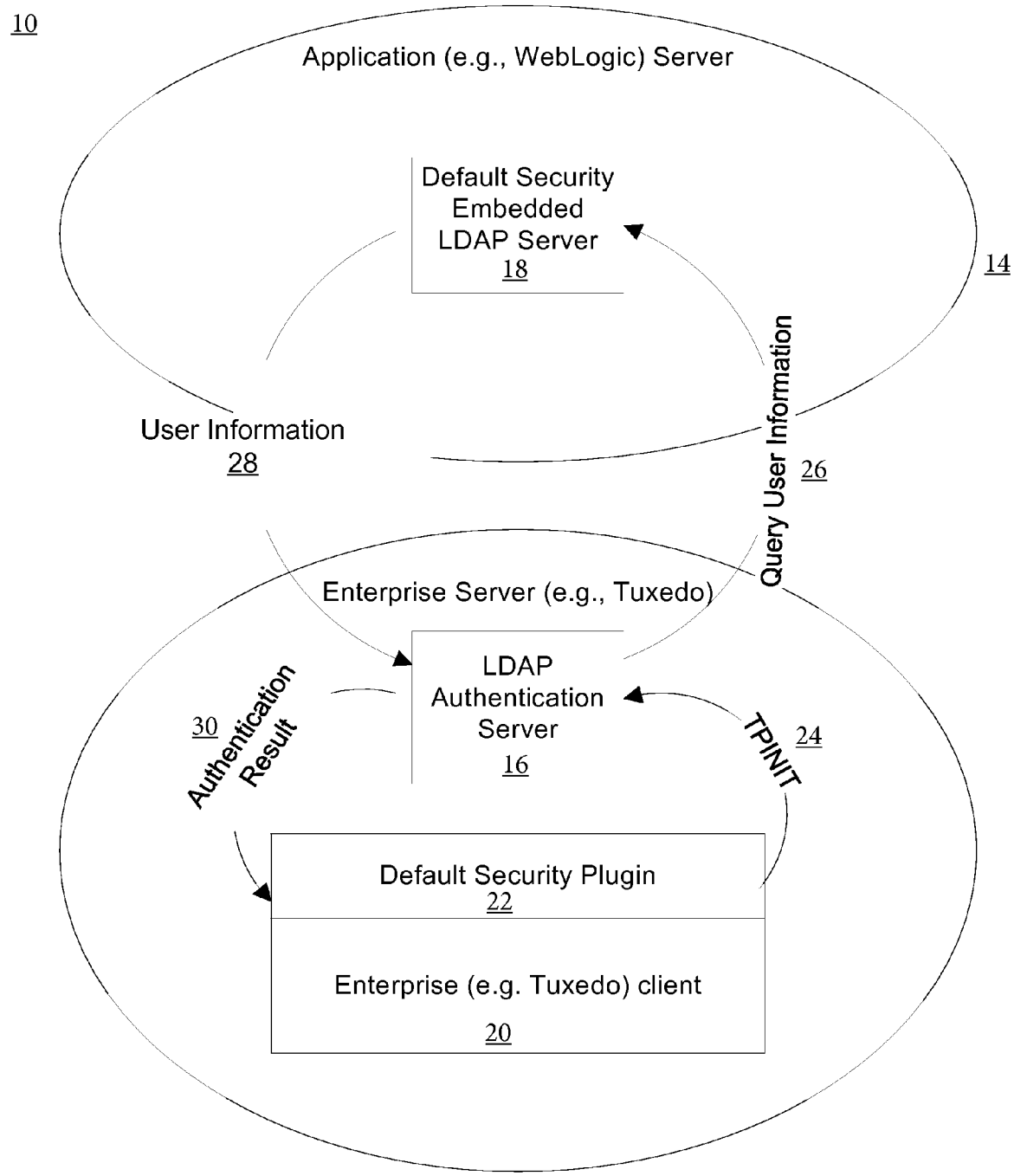
FIG. 1 illustrates a schematic of a single security system in accordance with an embodiment of the invention.

The present invention solves the problem of managing security over different computing environments by consolidating all user related information at a central point, for example within an application server. With traditional security architectures, an enterprise system administrator who had both application servers (for example the WebLogic Server product from BEA Systems, Inc., referred to herein as WLS), and other enterprise systems (for example the Tuxedo product, also from BEA Systems, Inc.), deployed within their environment, would usually have to manage two sets of security information, in this instance one for WebLogic Server and the other one for Tuxedo. The present invention leverages the application server's security to help the system administrator managing their security database, by eliminating user and group information from the enterprise system. System-specific information, such as Access Control List information can still reside in the Tuxedo product.

More particularly, in an environment that includes either multiple application servers, or an application server and a legacy-type system, the present invention provides the system administrator with a means to manage their security database from a central point. In accordance with one embodiment, the application server's security features are leveraged to provide user authentication throughout the enterprise, which allows user and group information to be eliminated from the enterprise system. This new feature leverages OPEN Lightweight Directory Access Protocol (LDAP) to make a single user security data store and administration possible. The use of a single data store assists the system administrator by only requiring them to maintain user security information at a single location, for example at a WebLogic Server embedded LDAP server. The single security administration also means the system administrator can administer the security information from a single system, e.g. from within the WebLogic Server Console program.

In accordance with one embodiment, the system can be used to consolidate all user related information in WebLogic Server (WLS). Without this feature the system administrator of a Tuxedo/WLS environment would have to administer the user information separately in both Tuxedo and WLS. The administrator should be aware that the Tuxedo-specific tpgrp, and tpacl file information should still be maintained in Tuxedo if the Tuxedo ACL or MANDATORY_ACL is desired.

DEFINITIONS OF TERMS, ACRONYMS, AND ABBREVIATIONS

AAA: Authentication, Authorization, and Auditing.
ACL: Access control list. The authorization scheme used by Tuxedo.
LDAP: Lightweight Directory Access Protocol. A standard way of managing directory information.
MP: It specifies a multi-machine configuration for a Tuxedo application.
PIF: Plug-In Framework. A Tuxedo infrastructure component that allows customization of BEA Tuxedo infrastructure capabilities through the use of plug-in module.
Schema: It is used to define the structure of LDAP database. Every LDAP server must use a particular schema, which defines what attributes can be stored in what type of object.
SDS: System Data Store. The LDAP used internally by WLS default security service.
UBBCONFIG: Tuxedo System IT ASCII configuration file.
DN: Distinguished Name.

FIG. 1 shows an illustration of a single security system 10 in accordance with an embodiment of the invention. In the past, the Tuxedo user security file would have to be copied from Tuxedo to each WLS server for use by that server in authenticating users. However, using the invention a Tuxedo customer can access the WLS security. As shown in FIG. 1, a first enterprise or application server 12 (e.g. a Tuxedo server) communicates with a second enterprise or application server 14 (e.g. a WLS server). The first (Tuxedo) server provides an LDAP authentication server 16. In this embodiment the LDAP authentication server replaces the regular Tuxedo authentication server, but from the perspective of a Tuxedo user operates much the same in that it continues to understand Tuxedo tpinit calls, etc. The second (WLS) server 14 includes an embedded LDAP server plugin 18 to allow the Tuxedo user to use WLS security. When, for example, a Tuxedo client 20 makes a tpinit call, the Tuxedo library directs this call to the default security plugin 22, which in turn forwards the tpinit call 24 to the LDAP authentication server 16. The LDAP authentication server 16 checks a user profile database (or user profile configuration information) to determine where the particular user security information is stored. An LDAP session is then initiated between the first (Tuxedo) server 12 and the second/determined (WLS) server 14. A query user information 26 is passed from the LDAP authentication server 16 to the embedded LDAP server 18 at the WLS, specifying a particular user. The corresponding user information 28 is then returned to the LDAP authentication server 16. Upon receipt of the user information a token 30 is then created that reflects this authentication result, and which can be used by the Tuxedo client.

The Tuxedo system shown in FIG. 1 does not need to be drastically changed in order to provide the distributed authentication—the LDAP authentication server is just configured so that it understands a standard Tuxedo tpinit call. From the clients' perspective the authentication process is the same as before (i.e. without single security implemented).

It should be noted that although a Tuxedo server and a WLS server is shown in FIG. 1, the present system and methods can be implemented to work with other application servers and enterprise servers that support LDAP, or that support the use of an embedded LDAP authentication server. Furthermore, a cluster or plurality of servers can be used to implement single security administration, and to provide backup or failover authentication should one of the servers, or the communications link to one of the servers, fail. The failover server needs to be able to provide the LDAP authentication service.

In addition, in some embodiments a user information cache may be provided in order to temporarily cache a copy of the user authentication information in case of a failure in the communications link between the two servers. Whenever necessary, the cache can be flushed to effectuate immediate changes to the security information.

The system may also be fully scalable so that multiple authentication servers can be used, as can multiple embedded LDAP servers.

Figure 2:
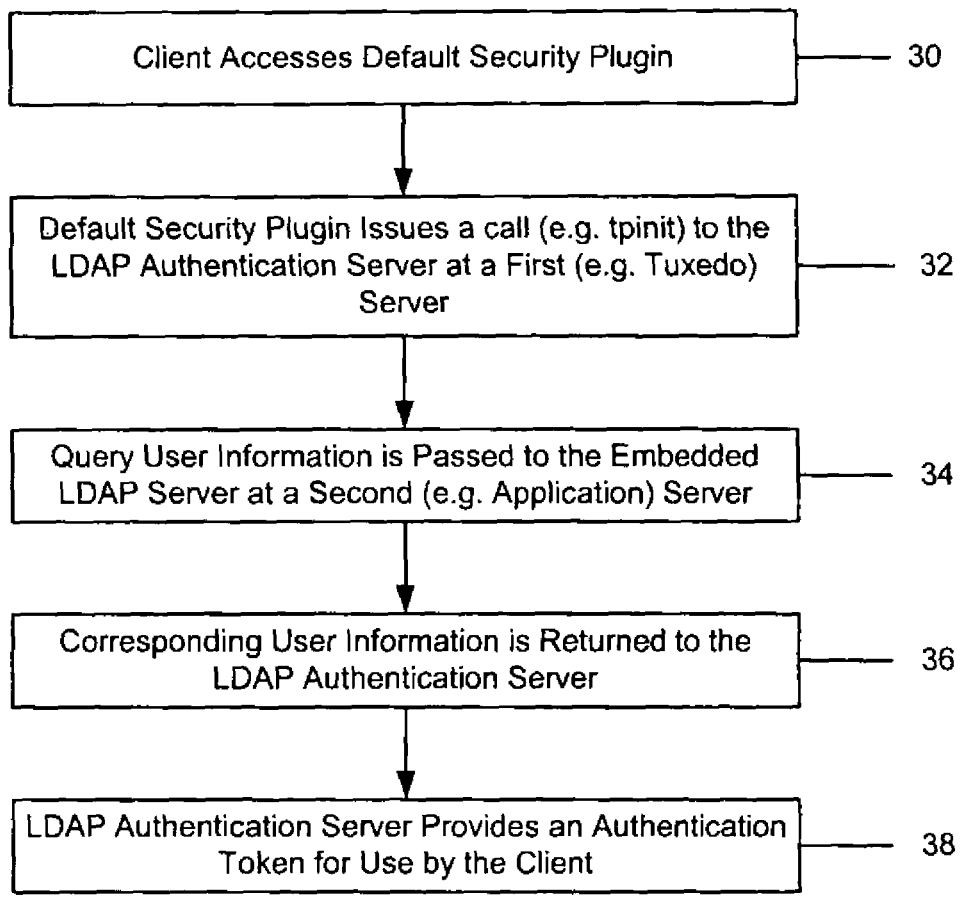
FIG. 2 illustrates a flowchart of a method for providing single security administration in accordance with an embodiment of the invention.

FIG. 2 illustrates a flowchart of a method in accordance with an embodiment of the invention. As shown therein, in step 30, the client (in this instance a Tuxedo client) accesses the default security plugin. In step 32, the default security plugin issues a call (such as a tpinit call) to the LDAP authentication server. In step 34, the query user information is passed to the embedded LDAP server at the application server (for example the WebLogic Server). In step 36, corresponding user information is then returned to the LDAP authentication server. In step 38, the authentication server provides an authentication token for use by the client.

Migration Tool

In addition to providing real-time authentication of users between different application server types, another application of the present system is that it can be used to perform migration of users from one system to another. For example, Tuxedo user information (from tpusr and tpgrp file) can be migrated to WebLogic Server. During migration, the migrating utility, tpmigldap, takes input tpusr and tpgrp file and updates the corresponding WebLogic server security database.

Tuxedo/WLS Architecture

In the context of a Tuxedo/WebLogic server environment, an embodiment of the present invention allows Tuxedo to use WLS as the security database to authenticate Tuxedo users. In accordance with this embodiment, the single security database resides in WebLogic Server. It is required to modify the Tuxedo UBB configuration file to enable this new feature. At the same time Tuxedo can continue to support the old Tuxedo security authentication styles, such as NONE, APP_PW, USER_AUTH, ACL, and MANDATORY_ACL. For customers with both Tuxedo and WebLogic Server, but who do not need to do tight integrating, they can continue configuring and operating Tuxedo as they had done before, i.e. have separate security database and separate security administration. However, the feature is especially useful for those customers who prefer to not maintain separate user databases.

The following is the list of the functions provided by this feature:
 a. Single User Security Database
 b. Single User Security Administration User Characteristics and Impact There is no visible impact to the Tuxedo user or the server/client programming interface, since all of the changes to provide single security are "under the cover". The default Tuxedo security type is "NONE" in the RESOURCES section of the UBBCONFIG file just as before. It can continue supporting other types of Tuxedo security, such as APP_PW, USER_AUTH, ACL, and MANDATORY_ACL. The difference "under the cover" is that user authentication will actually retrieve user information from WLS instead of reading it from the tpusr file.

Single User Security Database

In the current implementation, Tuxedo stores its security configuration information in three files. The tpusr file contains the Tuxedo user information including password. The tpgrp file contains the Tuxedo group information. The tpacl file contains the Tuxedo Access Control List information. This new functionality allows Tuxedo to access the user security information stored in the WLS embedded LDAP server. The security information stored in WebLogic Server contains information such as user identification, password, and which security groups the user is a member. If this feature is used then there is no more need for tpusr file. However, the tpacl, and tpgrp files are still required if Tuxedo security is configured to use either ACL or MANDATORY_ACL.

In one embodiment, for Tuxedo user information, the WLS LDAP database contains both the user name and password. The Tuxedo user name is mapped to WLS System Data Store object class inetOrgPerson's "uid" that is the identity of login id. This will be set to the value entered for the user in the WLS Admin console. The user password is mapped to the "userpassword" in the inetOrgPerson class. Which group the user belongs to is mapped to the "wlsMemberOf" in the inetOrgPerson class.

For Tuxedo, group information is stored in WLS groupOfURLs class. The name of the Tuxedo group is the common name (cn) attribute of the groupOfURLs. This group common name will be set to the value entered for the group from the WLS Admin console. The following table describes these mapping.

| Tuxedo Name | LDAP class | LDAP attribute |
| --- | --- | --- |
| User name | InetOrgPerson | uid |
| User password | InetOrgPerson | userpassword |
| User group information | InetOrgPerson | wlsMemberOf |
| Group | GroupOfURLs | cn |

This function removes the need for the traditional Tuxedo user-security database file, tpusr. Instead, WebLogic Server's embedded LDAP stores all the information required for Tuxedo user authentication. At runtime, a Tuxedo authentication server, LAUTHSVR, will retrieve user information from the WebLogic Server's embedded LDAP and authenticates user. If the authentication is successful then an appkey will be returned to user.

In Tuxedo, a Tuxedo user can only belong to one Tuxedo group. However, in WLS a user can be member of several groups. To resolve this problem, in one embodiment, the authentication server will put a user in the first Tuxedo group it discovered. For example, suppose a user Sam belongs to GRP1, GRP2, and WLSGRP. Both GRP1, and GRP2 are defined in tpgrp file thus are Tuxedo groups. WLSGRP is not defined in tpgrp file, and it is not mapped to Administrators and Operators groups so it is not a Tuxedo group. When Sam logs into Tuxedo, authentication server found Sam belongs to GRP1 before it found out Sam also belongs to GRP2, then Sam will be assigned the APPKEY with value of GRP1.

A valid Tuxedo group is a group defined in tpgrp file plus the Administrators and Operators groups. By default Administrators maps to WLS "Administrators" group, and Operators maps to WLS "Operators" group. So by default a WLS Administrators user can also administrator Tuxedo, a WLS Operators user can operate Tuxedo. This default mapping can be modified through the configuration file. By changing the mapping a Tuxedo administrator may not be a WLS administrators, and vice versa.

Single Security Administration

In accordance with one embodiment, the single security system and methods can be used to allow the system administrator to administer the security database from within the WLS console for Tuxedo. This features uses the single data repository for user security information as described above. The administrator only needs to configure the user and user password once in WLS instead of configuring the user in both Tuxedo and WLS. This means the administrators can configure all of their Tuxedo and WLS users from a single WLS admin console. Since the single authorization is not required, this approach only stores user name and user password information in WLS LDAP. Tuxedo continues to hold the information of group and access control list. This is simpler since it only uses WLS to resolve user authentication.

The present invention may be conveniently implemented using a conventional general purpose or a specialized digital computer or microprocessor programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, while the embodiments of the system described above are described in the context of WebLogic and Tuxedo servers, it will be evident that the system may be used with other types of applications, clients, application servers, and enterprise servers. It will also be evident that the system can be used to provide security for users and for user/client applications, and that the system may be extended to include a plurality of servers. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

The invention claimed is:

1. A system for supporting security administration, comprising:
    an application server, executing on one or more microprocessors, that includes a Lightweight Directory Access Protocol (LDAP) security database; and
    a transactional server for processing transactional procedural calls, wherein the transactional server includes
        one or more security files mapped to the LDAP security database,
        a transactional authentication server configured to authenticate the transactional procedural calls using the one or more security files,
        an LDAP authentication server configured to authenticate the transactional procedural calls using the LDAP security database, and
        a configuration file that specifies which authentication server should authenticate the transactional procedural calls;
    wherein when the LDAP authentication server, as specified by the configuration file, receives a transactional procedure call from a client associated with a particular user, for use with a transaction, the LDAP authentication server operates to
        initiate an LDAP session with the LDAP security database for receiving security information,
        receive the user security information from the LDAP security database,
        authenticate the particular user using the received user security information, and
        create a token that reflects an authentication result, which is used by the client to participate in the transaction.

2. The system of claim 1, further comprising a user information cache that caches a copy of said user security information in case of a failure in a communication link between the LDAP authentication server on the transactional server and the LDAP security database on the application server.

3. The system of claim 1 wherein said transactional server is scalable to include multiple LDAP authentication servers.

4. The system of claim 1, further comprising:
    a migrating utility that migrates user security information from separate security repositories associated with the transactional server to the LDAP security database.

5. The system of claim 1, wherein the LDAP server on the application server includes a console program for administering security of the transactional server.

6. The system of claim 1 wherein an administrator of the transactional server is mapped to an administrator for the application server.

7. The system of claim 1, wherein said transactional server includes an access control list used for authorizing the transactional procedure call.

8. The system of claim 1, wherein the transactional authentication server on the transactional server defines a transactional user group for the transactional authentication server, while the LDAP authentication server defines a user group for the LDAP security database on the application server.

9. A method for supporting security administration, comprising:
    providing an application server executing on one or more microprocessors, that includes a Lightweight Directory Access Protocol (LDAP) security database;
    providing a transactional server for processing transactional procedural calls, wherein the transactional server includes one or more security files mapped to the LDAP security database, a transactional authentication server configured to authenticate the transactional procedural calls using the one or more security files, an LDAP authentication server configured to authenticate the transactional procedural calls using the LDAP security database, and a configuration file that specifies which authentication server should authenticate the transactional procedural calls;
    receiving, via the LDAP authentication server as specified by the configuration file, a transactional procedure call from a client associated with a particular user, for use with a transaction;
    initiating an LDAP session with the LDAP security database for receiving security information of the particular user from the LDAP security database;
    receiving the user security information from the LDAP security database;
    authenticating the particular user using the received corresponding user security information; and
    creating, via the LDAP authentication server, a token that reflects an authentication result, which is used by the client to participate in the transaction.

10. A non-transitory machine readable storage medium having instructions embedded thereon and when executed by a processor performing the steps comprising:
    configuring a transactional server for processing transactional procedural calls, wherein the transactional server includes one or more security files mapped to a LDAP security database on an application server, a transactional authentication server configured to authenticate the transactional procedural calls using the one or more security files, an LDAP authentication server configured to authenticate the transactional procedural calls using the LDAP security database, and a configuration file that specifies which authentication server should authenticate the transactional procedural calls;
    receiving, via the LDAP authentication server as specified by the configuration file, a transactional procedure call from a client associated with a particular user, for use with a transaction;
    initiating an LDAP session with the LDAP security database, for receiving security information of the particular user from the LDAP security database;
    receiving the user security information from the LDAP security database;
    authenticating the particular user using the received corresponding user security information; and
    creating, via the LDAP authentication server, a token that reflects an authentication result, which is used by the client to participate in the transaction.

11. The system of claim 1 wherein the transactional server stores transaction group information and access control information.

12. The non-transitory machine readable storage medium of claim 10, wherein a user information cache is used to cache a copy of said user information in case of a failure in a communication link between the transactional LDAP authentication server and the LDAP security database.

13. The non-transitory machine readable storage medium of claim 10, wherein said transactional server is scalable to include multiple LDAP authentication servers.

14. The method of claim 9, wherein a user information cache is used to cache a copy of said user information in case of a failure in a communication link between the transactional LDAP authentication server and the LDAP security database.

15. The method of claim 9, wherein said transactional server is scalable to include multiple LDAP authentication servers.

16. The method of claim 9, further comprising:
    providing a migrating utility that migrates user security information from separate security repositories associated with the transactional server to the LDAP security database.

17. The method of claim 9, wherein each transactional procedural call is a function call invoked the client to participate in the transaction.

18. The non-transitory machine readable storage medium of claim 10, wherein a migrating utility is used to migrate user security information from separate security repositories associated with the transactional server to the LDAP security database.

19. The non-transitory machine readable storage medium of claim 10, wherein each transactional procedural call is a function call invoked the client to participate in the transaction.

20. The system of claim 1, wherein each transactional procedural call is a function call invoked the client to participate in the transaction.

* * * * *